United States Patent [19]
Allaire

[11] 3,977,080
[45] Aug. 31, 1976

[54] CUTTING GUIDE FOR POWER HANDSAW

[76] Inventor: Joseph Paul Allaire, 228 NE. 22nd Ave. - Apt. 4, Pompano Beach, Fla. 33062

[22] Filed: July 30, 1975

[21] Appl. No.: 600,294

[52] U.S. Cl. .................................................. 30/376
[51] Int. Cl.² ........................................ B27B 27/02
[58] Field of Search .................. 30/166 R, 370, 371, 30/372, 373, 289, 166 A, 374, 375, 376, 377

[56] References Cited
UNITED STATES PATENTS

| | | | |
|---|---|---|---|
| 3,536,112 | 10/1970 | Kordyban | 30/376 |
| 3,586,077 | 6/1971 | Pease | 30/376 |
| 3,645,307 | 2/1972 | Stocker | 30/376 |

Primary Examiner—Al Lawrence Smith
Assistant Examiner—J. C. Peters

[57] ABSTRACT

A cutting guide for a power handsaw which cutting guide is of simple and inexpensive construction; is easily transported and used; and is particularly adapted to hold the material to be cut along the desired line of cut, whereby to prevent shivering upon cutting. This cutting guide includes an elongated support plate or strip, a guide ridge projecting from the top face of the support plate and forming a longitudinal guide for a power handsaw running lengthwise of the support plate. The opposite lateral edges of the support plate are arranged parallel and at predetermined and distinct spacings from the guide ridge.

2 Claims, 3 Drawing Figures

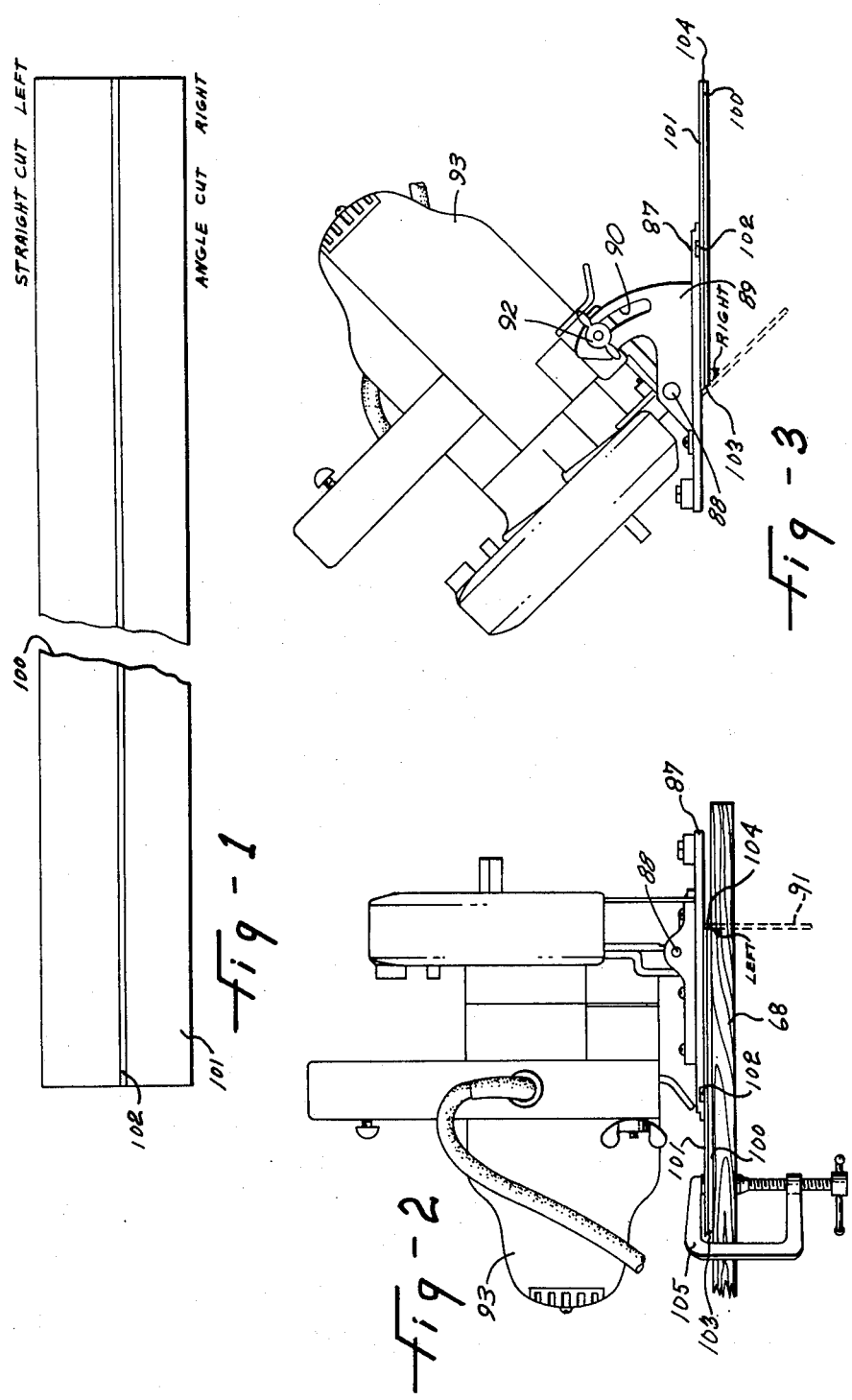

CUTTING GUIDE FOR POWER HANDSAW

This invention relates to an accessory for a power handsaw, adapted to produce straight and inclined cuts and, more particularly, to a cutting guide and assembly.

Various devices have so far been proposed to assist cutting along straight lines with a power handsaw. However, these known devices require extensive modifications of the handsaw, which add weight to the latter and hinder its normal use.

It is a general object of the present invention to provide a cutting guide for a power handsaw which requires minimum modification of the handsaw; this modification does not add weight to the handsaw and does not prevent its use on a flat surface without the cutting guide.

It is a more specific object of the present invention to provide a cutting guide strip of the character described which has two operative longitudinal edges with a guiding ridge therebetween closer to one of the edges and adapted to slidably engage a groove made in the base plate of the handsaw, so arranged that anyone of the edges is selectively positioned along a desired line of cut with the saw blade positioned along a selected edge, depending on whether the saw is upright to make a square cut or inclined to make a 45° cut.

The invention will now be defined in detail with reference to a preferred embodiment thereof which is illustrated, by way of example, in the accompanying drawing, wherein:

FIG. 1 is a plan view of a cutting guide according to the present invention;

FIG. 2 is an end view of the cutting guide as seen from the right in FIG. 1 and operatively mounted in cooperation with a power handsaw to produce straight cuts; and FIG. 3 is an end view as in FIG. 2, but with the saw operatively positioned to produce inclined cuts.

The cutting guide is adapted to be used in association with a conventional power handsaw in which the only modification is in its base plate. The handsaw, illustrated in FIGS. 2 and 3, has a motor housing 93 for an electric motor, to the output shaft of which is secured the conventional circular saw blade 91. The handsaw is provided with the base plate 87 having the usual slot for the passage of the blade 91 and pivoted to the motor housing 93 about a pivotal axis 88, which is disposed parallel to the plane of the blade 91, and close to said plane, whereby the housing 93 and, consequently, the blade 91 can take two specific positions with respect to the base plate 87, namely: a vertical position shown in FIG. 2, to make a square cut, and an inclined position shown in FIG. 3, to make a 45° cut. The housing may take intermediate inclined positions. It is clear that inclining the blade changes the position transversely of the base plate 87, of the portion of the blade at the level of base plate 87.

Means are provided to retain the housing in adjusted inclined position, said means being an upright flange 89 secured to the base plate 87 and provided with an arcuate slot 90, co-axial with axis 88, and through which extends a bolt secured to the housing 93 and fitted with a wing nut 92 for adjustably clamping flange 89 to housing 93.

The illustrated cutting guide is made of a flat aluminum strip, or elongated support plate 100, forming the base or core thereof. A piece of fiber 101 is glued, or otherwise adhered, on the top face of the elongated support plate 100. This piece of fiber 101 is coextensive with the plate 100. A straight guide ridge 102 is secured onto the fiber 101 lengthwise of the support plate 100, is coextensive with plate 100 and is adapted to slidably fit within a straight slot made in the underface of the base plate 87 of the handsaw, coextensive with base plate, opening at both ends of the latter and parallel to the plane of saw blade 91.

The support plate 100 is faced with fiber 101 to facilitate sliding of the baseplate 87 of the saw on the cutting guide.

It must be noted that the opposite lateral edges 103 and 104 of the cutting guide are parallel to the ridge 102 and spaced at predetermined and different distances from the latter. More specifically, the lateral edge 103 is closer to the guide ridge 102 than the lateral edge 104 and is bevelled such that, as shown in FIG. 3, for a 45° cut, the blade 91 runs very close to this edge. The lateral edge 104 is squared such that the blade 91 runs along and very close to the latter for a square or 90° cut. Thus, the edges 103 and 104 ensure contact of the cutting guide with the material being cut adjacent the line of cut and, thus, prevents shivering of the material being cut. The edges 103 and 104 serve also as means to indicate where the saw will cut. The different distances of the edges 103 and 104 from the ridge 102 are necessitated by the fact that blade 91 in its inclined position is closer to the groove made at its underside than its upright position. To use edge 103 instead of edge 104, and vice versa, the relative positions of the handsaw and cutting strip are simply reversed.

The cutting guide can be attached to the piece of work 68 in any suitable way, such as by ordinary small C-shaped clamps 105, as seen in FIG. 2, such as at the opposite ends of the piece of work.

The afore-described cutting guide may be used such as to shorten or fit a door, to cut panelling, to make shelves, furniture, etc.

I claim:

1. A cutting guide for a powered handsaw of the type including a motor housing, a motor in said housing, a saw blade driven by said motor, a base plate hinged to said motor housing about an axis parallel to the plane of said saw blade and close to the latter, and means to removably secure said base plate in at least two pivotal positions relative to said housing and blade to perform 90° and 45° cuts, respectively, said base plate having a straight groove at its underface running from end to end and parallel to the plane of said saw blade, said cutting guide comprising a strip having a flat bottom face and opposite straight parallel lateral edges, a straight guide ridge projecting from the top face of said strip and extending parallel to said lateral edges and from one end to the other of said strip, said ridge slidably fitting within said groove of said base plate, when said base plate rests on said strip, one of the two lateral edges being closer to the guide ridge, being at a distance such that it extends very close to the saw blade when the latter is inclined to make a 45° cut, the other lateral edge being farther away from said guide ridge at a distance such that it extends very close to the saw blade when the latter is in upright position to perform a 90° cut.

2. A cutting guide as defined in claim 1, wherein said one lateral edge is bevelled at 45° inwardly downwardly, being thus indicative of its use for 45° cuts, while said other lateral edge is square, being thus indicative of its use for 90° cuts.

* * * * *